US009857008B2

(12) United States Patent
Swift et al.

(10) Patent No.: US 9,857,008 B2
(45) Date of Patent: Jan. 2, 2018

(54) CRIMPABLE OR SWAGEABLE FLUID POWER FERRULES, COUPLINGS, SYSTEMS AND METHODS EMPLOYING TORQUE COMMUNICATION

(75) Inventors: Jonathan Clark Swift, Cambridge (GB); Marvin Miller, Westminster, CO (US)

(73) Assignee: Gates Corporation, Denver, CO (US)

( * ) Notice: Subject to any disclaimer, the term of this patent is extended or adjusted under 35 U.S.C. 154(b) by 1619 days.

(21) Appl. No.: 12/621,283

(22) Filed: Nov. 18, 2009

(65) Prior Publication Data

US 2010/0140926 A1 Jun. 10, 2010

Related U.S. Application Data

(63) Continuation-in-part of application No. 12/313,400, filed on Nov. 20, 2008, and a continuation-in-part of application No. 12/313,406, filed on Nov. 20, 2008.

(51) Int. Cl.
*F16L 33/207* (2006.01)
*F16L 33/20* (2006.01)

(52) U.S. Cl.
CPC ........... *F16L 33/2076* (2013.01); *F16L 33/20* (2013.01)

(58) Field of Classification Search
USPC ....................................................... 285/256
See application file for complete search history.

(56) References Cited

U.S. PATENT DOCUMENTS

| 1,808,101 A | 6/1931 | Eastman |
| 2,121,624 A | 6/1938 | Cowles |
| 2,273,398 A | 2/1942 | Couty et al. |

(Continued)

FOREIGN PATENT DOCUMENTS

| EP | 1 564 472 A1 | 8/2005 |
| EP | 1 740 873 B1 | 4/2008 |

(Continued)

OTHER PUBLICATIONS

Notification of Transmittal of the International Search Report and the Written Opinion of the International Searching Authority, or the Declaration, PCT/US2009/006204, dated Mar. 15, 2010.

*Primary Examiner* — Aaron M Dunwoody
(74) *Attorney, Agent, or Firm* — Paul N. Dunlap, Esq.; Jeffrey A. Thurnau, Esq.

(57) ABSTRACT

A hose end coupling unitary, one-piece radially crushable ferrule has a crushable socket portion, a deformable attachment portion, and a work hardened torque communication portion defined between the socket portion and the attachment portion. The torque communication portion may be formed in the unitary one-piece radially crushable ferrule, contiguous with the socket portion and the attachment portion. Corners of the torque communication portion may be strengthened and/or the torque communication portion work hardened by disposing a die set about the formed torque communication portion and pressing the torque communication portion into the die set, strengthening corners of the torque communication portion and work hardening the torque communication portion. A mandrel having a desired internal shape of the torque communication portion may be deployed inside the torque communication portion during pressing.

12 Claims, 6 Drawing Sheets

(56) References Cited

U.S. PATENT DOCUMENTS

| | | | |
|---|---|---|---|
| 2,314,001 A * | 3/1943 | Lusher et al. | 285/256 |
| 2,314,002 A | 3/1943 | Lusher et al. | |
| 2,517,669 A | 8/1950 | Hufferd et al. | |
| 2,648,123 A * | 8/1953 | Phillips | 29/511 |
| 2,797,111 A | 6/1957 | Beazley | |
| 3,433,505 A * | 3/1969 | Weatherhead | 285/148.18 |
| 3,442,537 A * | 5/1969 | Mack et al. | 285/148.13 |
| 3,687,491 A | 8/1972 | Marshall | |
| 4,099,748 A | 7/1978 | Kavick | |
| 4,226,446 A | 10/1980 | Burrington | |
| 4,498,691 A | 2/1985 | Cooke | |
| 4,804,212 A | 2/1989 | Vyse | |
| 5,267,758 A | 12/1993 | Shah et al. | |
| 5,317,799 A | 6/1994 | Chapman et al. | |
| 5,553,896 A | 9/1996 | Woodward | |
| 6,189,199 B1 * | 2/2001 | Ouchi et al. | 29/557 |
| 6,296,283 B1 | 10/2001 | Dietzel | |
| 6,447,020 B1 * | 9/2002 | Kacines et al. | 285/256 |
| 6,540,262 B1 * | 4/2003 | Humphreys | 285/256 |
| 6,659,510 B1 | 12/2003 | Ikegama et al. | |
| 6,764,106 B1 * | 7/2004 | Smith et al. | 285/256 |
| 7,210,708 B2 | 5/2007 | Muto | |
| 7,472,931 B2 * | 1/2009 | Kerin et al. | 285/319 |
| 7,954,861 B2 | 6/2011 | Swift et al. | |
| 8,096,588 B2 * | 1/2012 | Winzeler | 285/258 |
| 2002/0096877 A1 * | 7/2002 | Kacines et al. | 285/55 |
| 2003/0038478 A1 * | 2/2003 | Humphreys | 285/256 |
| 2006/0131878 A1 | 6/2006 | Wulf et al. | |
| 2008/0185840 A1 | 8/2008 | Menor | |
| 2008/0284164 A1 * | 11/2008 | Kerin et al. | 285/256 |
| 2009/0072532 A1 | 3/2009 | Dixon-Roche | |

FOREIGN PATENT DOCUMENTS

| | | |
|---|---|---|
| FR | 1495499 | 6/1966 |
| JP | 61-175688 U | 11/1986 |
| JP | H02-300594 A | 12/1990 |
| JP | H04-013433 A | 1/1992 |
| JP | 2000-146064 | 5/2000 |
| JP | 2002-039466 A | 2/2002 |
| JP | 2003-287178 A | 10/2003 |
| RU | 96116854 A | 11/1998 |
| WO | WO 9108414 A1 | 6/1991 |
| WO | 9418487 A1 | 8/1994 |
| WO | WO 2008/103315 A2 | 8/2008 |

* cited by examiner

CRIMPABLE OR SWAGEABLE FLUID POWER FERRULES, COUPLINGS, SYSTEMS AND METHODS EMPLOYING TORQUE COMMUNICATION

CROSS-REFERENCE TO RELATED APPLICATION

This is a continuation in part of U.S. patent application Ser. No. 12/313,400, also entitled Crimpable or Swageable Fluid Power Ferrules, Couplings, Systems and Methods Employing Torque Communication, Filed Nov. 20, 2008, and of U.S. patent application Ser. No. 12/313,406, entitled Crimpable or Swageable Fluid Power Ferrules, Couplings, Systems and Methods, also filed Nov. 20, 2008, both of which are incorporated herein by reference.

BACKGROUND OF THE INVENTION

Field of the Invention

This invention relates generally to attachable couplings of the male-stem, ferrule type for use with reinforced, flexible hose but more particularly, this invention relates to such couplings, which employ a ferrule with or without an insert for gripping a hose end, wherein the ferrule may include a torque communication portion.

Description of the Prior Art

Couplings of the type that are post assembled to an end of a finished hose product typically have a male-stem portion that is insertable into a hose end and a ferrule that is concentric with the male-stem. Together, the male-stem and ferrule define an annular cavity for receiving a hose end. A coupling is retained by pinching the hose end in the annular cavity between the ferrule and stem such as by either radially reducing some part or element of the ferrule or by radially increasing the size of the male-stem.

Some couplings are of the reusable type and use a mechanical means of the coupling such as threaded members that activate means for pinching a hose against a stem. An example of such a reusable coupling appears in European patent EP0241651 where a plurality of coaxial rings having alternating frustoconical surfaces are axially pressed together by a threaded member to wedge alternate rings radially inwardly. The wedged rings pinch a hose against a stem. Such reusable couplings are usually expensive because the co-acting parts forming the coupling are typically machined from barstock. Furthermore, the amount of pinching cannot be precisely controlled for a range of hoses when the coupling is attached to a hose.

Crushable types of ferrules that may be of different sizes for different hose constructions having the same bore size are preferred for accurately controlling how an end of a hose is pinched. For example, radially reducing the size of a ferrule by crushing it to a smaller diameter may be accomplished through crimping processes that use a plurality of circumjacently arranged die fingers.

Oftentimes, a serrated stem with a ferrule locking collar is used for high pressure hoses that are subjected to pressure impulses. For convenience of assembly, a ferrule may be pre-attached to a stem such as by crimping an end portion of the ferrule to the ferrule locking collar. While preattachment of a ferrule to a stem has advantages associated with reducing the number of parts for assembly to a hose, it introduces a disadvantage as to the number of parts required for a line of hose sizes because some hoses require the same size stem but different size ferrules. For example, three different size ferrules may be used with the same size stem for coupling one-half inch ID hose having different tube, reinforcement, and cover combinations. Consequently, some manufacturers prefer to select an appropriate ferrule for a hose when it is to be crimped on a hose so as to minimize inventory.

To address these and other problems, a ferrule for use in attaching a hose end portion to a male-stem was developed and patented in U.S. Pat. No. 5,267,758, wherein the ferrule has a crushable socket portion which retains a bendable sleeve-like insert having substantially a "C" shape. This insert employs means, such as ribs formed along an inside surface, for gripping a hose end. In another form, the sleeve-like insert has a plurality of offset teeth at circumjacently spaced end portions of its "C" shape which teeth interdigitate with each other when the ferrule is used for attaching a hose end portion to a male-stem. The teeth accommodate a range of hose diameters and hose constructions. However, notably the disclosed and claimed crimped-on coupling is made-up of three primary components: a stem, adapted to be inserted into a hose; a staked collar, which includes wrenching flats or the like, typically employed as a "back-up hex"; and a ferrule, which houses the aforementioned "C" shaped insert.

SUMMARY

The present invention is directed to coupling, and associated systems and methods which employ a unitary integrated ferrule, with or without an insert, for gripping a hose end, wherein the ferrule may include torque communication and attachment portions in addition to a socket portion, thereby eliminating one component and one possible leak path in a crimped-on, swaged-on or similarly installed, coupling.

In accordance with various embodiments of the present invention, a unitary one-piece radially crushable ferrule might comprise a crushable socket portion, an attachment portion, and a torque communication portion, which is, generally contiguous with the socket portion and the attachment portion, and provides torque communication to an attached fluid power component. This torque communication to an attached fluid power component may be provided following securement of the attachment portion to the component. The securement might comprise deformation of the attachment portion to interface with the component. The torque communication portion is preferably defined between the socket portion and the attachment portion and the torque communication portion preferably retains functional shape following crushing of the socket and deformation of the attachment portion to secure the ferrule to the component.

In accordance with various embodiments of the present invention, a unitary one-piece radially crushable ferrule comprises the aforementioned crushable socket portion and attachment portion. However, the torque communication portion, still generally contiguous with the socket portion and the attachment portion, is work hardened for better provision of torque communication to an attached fluid power component. Additionally, or alternatively, the socket portion and/or the attachment portion may be annealed. The work hardening helps the torque communication portion retain functional shape following crushing of the socket and deformation of the attachment portion to secure the ferrule to the component.

In most embodiments the socket portion retains an insert for gripping a hose end portion and preferably interfacing with an interior of the socket portion to prevent movement of the hose. This insert may be a "C" shaped insert, one or more coiled inserts, or a plurality of generally circular stacked inserts. Also, the socket portion might comprise a lip defined in an extent of the socket portion opposite the torque communication portion, and a seal may be disposed in the socket portion between the insert(s) and the lip.

A portion of a wall of the ferrule defining the torque communication portion may be thicker than a portion of the wall defining the socket portion and/or the portion of the wall of the ferrule defining the torque communication portion may be thicker than a portion of the wall defining the attachment portion. Alternatively, the portion of the wall defining the torque communication portion and the attachment portion may be thicker than a portion of the wall defining the socket portion.

An embodiment of a method of the present invention might include the following steps. Formation of a torque communication portion in a unitary one-piece radially crushable ferrule, contiguous with a crushable socket portion and an attachment portion formed in the ferrule. As noted the torque communication portion may be formed between the socket portion and the attachment portion. The forming of the ferrule might include shaping the ferrule from a single cylindrical sleeve having a uniform wall thickness by drawing the socket portion from the cylindrical sleeve such that the socket portion and/or the attachment portion have a wall thinner than a wall of the torque communication portion. The attachment portion may be disposed over a hose stem and the attachment portion secured to the stem. This securing might comprise deforming (i.e. staking) the attachment portion to interface with the stem. An open hose end is preferably inserted into the crushable socket portion and onto the stem and the socket portion is crushed to secure the coupling end to the hose.

In accordance with embodiments of the present invention having a strengthened or work hardened torque communication portion, or at least a torque communication portion having sharper corners, the torque communication portion formed in a unitary one-piece radially crushable ferrule is subjected to further processing. Corners of the torque communication portion are strengthened and/or sharpened by disposing a die set about the formed torque communication portion and pressing the formed torque communication portion with dies of the die set, thereby strengthening corners of the torque communication portion. This strengthening may arise from work hardening of the torque communication portion, in that the pressing may press a formed torque communication portion into a work hardened torque communication portion with smaller corner radii. Therefore the torque communication portion may initially be formed to have a size greater than it has following the strengthening, with the strengthening resulting in the torque communication portion having a desired size. Further, during the strengthening a mandrel having a desired internal shape of the torque communication portion may be deployed inside the formed torque communication portion prior to the pressing. Also, as mentioned the torque communication portion may be formed from cylinder.

An insert may be deployed in the socket portion, following forming of the ferrule. The insert preferably grips the hose and frictionally interfaces with an interior of the socket following the crush of the socket. As noted such an insert may be "C" shaped. Such a "C" shaped insert may define inner-circumferential teeth and corresponding outer-circumferential depressions. This "C" shaped insert may be formed by rolling the "C" shaped insert from barstock or sheet material having raised splines, that become inner-circumferential teeth upon the rolling, and that has corresponding indentions that become outer-circumferential depressions.

Thus, embodiments of a hose end coupling on the present invention might comprise a unitary one-piece stem having an exterior barb end portion and an exterior ferrule interface portion. A unitary one-piece radially crushable ferrule is, in accordance with the present invention, disposed over the stem. Preferably, the ferrule comprises a crushable socket portion disposed about the barb end portion, an attachment portion disposed about the ferrule interface portion, and a torque communication portion, contiguous with the socket and attachment portions. As noted, the torque communication portion may be defined between the socket portion and the attachment portion. Additionally, the exterior ferrule interface portion may be knurled. The ferrule interface portion might additionally or alternatively comprise an exterior circumferential longitudinal stop groove, with at least a portion of the attachment portion disposed about the longitudinal stop groove for staking into the groove to interface with the stop groove.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

Figure 1:
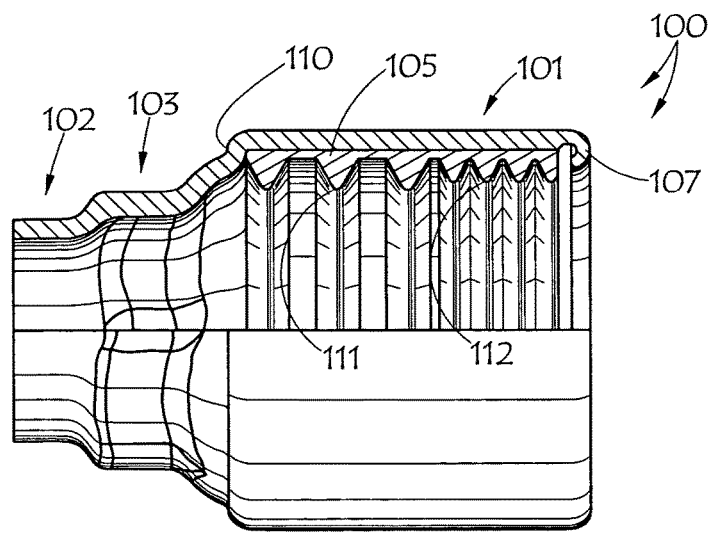
FIG. 1 is a fragmented, generally quarter-sectioned, side view of an embodiment of the present inventive ferrule.
Figure 5:
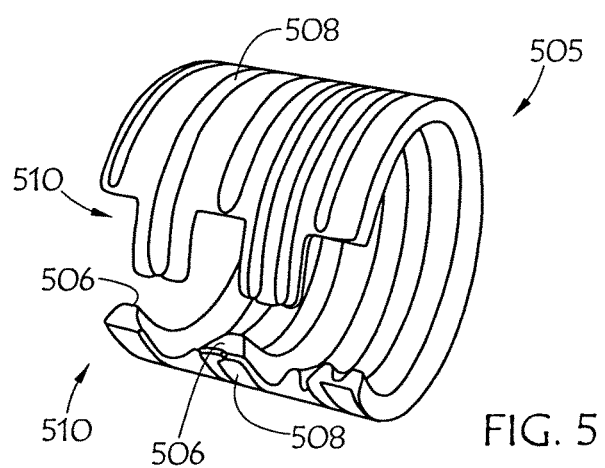
FIG. 5 is a perspective view of one embodiment of a "C" insert that may be employed in the present couplings, systems and methods.
Figure 6:
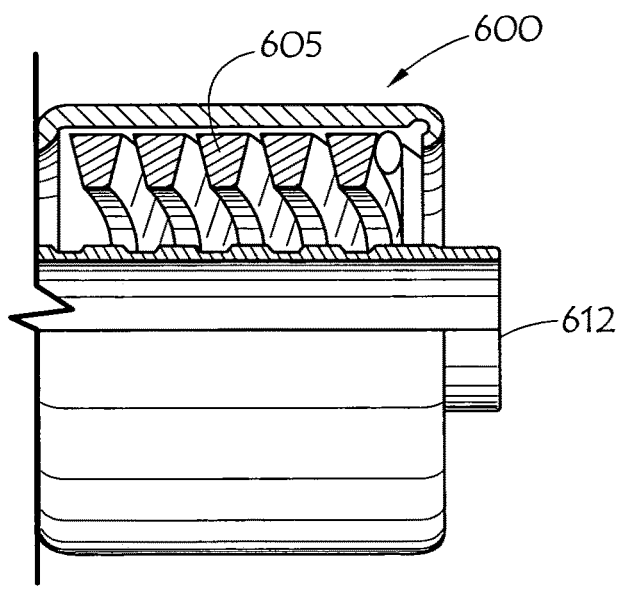
FIG. 6 is a fragmented, generally quarter-sectioned, side view of an embodiment of a ferrule employing a coiled insert in accordance with various embodiments of the present invention.
Figure 7:
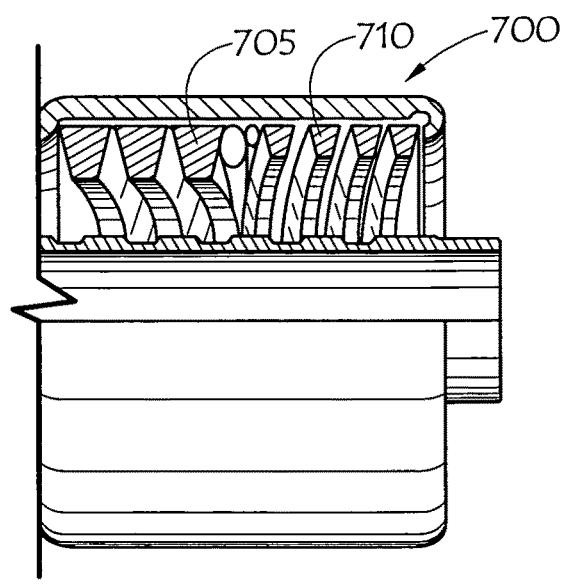
FIG. 7 is a fragmented, generally quarter-sectioned, side view of an embodiment of a ferrule employing a plurality of coiled insert in accordance with various embodiments of the present invention.

FIG. 1 is a fragmented, generally quarter-sectioned, side view of an embodiment of unitary one-piece radially crushable ferrule 100 comprising crushable, generally tubular socket portion 101, stakeable, deformable or otherwise securable attachment portion 102, and a torque communication portion 103, generally contiguous with socket and attachment portions 101 and 102. As shown in FIGS. 1 through 4 torque communication portion 103 may be disposed between socket portion 101 and attachment portion 102. Alternatively, the socket, attachment and torque communication portions might be disposed in other arrangements, for example the attachment portion might be disposed between the torque communication portion and the socket portion. Torque communication portion 103 might take a generally hexagonal configuration, such as shown in FIGS. 1 through 4, or any other usable "wrenching" shaped such as a square or other polygonal shape. Ferrule 100 may be made in a number of manners, such as by machining from barstock, swaging or drawing a preformed tubular member, or by deep drawing and stamping flat sheet stock into a tubular shape. It is preferably formed from sheet stock for economical considerations In various embodiments socket portion 101 retains insert 105 for gripping a hose end portion. Preferably, insert 105 is generally cylindrical. Insert 105 may be "C" shaped as shown in FIG. 5 or it might take another form, such as coiled insert 605 shown in FIG. 6 or a plurality of coiled inserts 705 and 710, such as shown in FIG. 7, each of which is discussed below in greater detail. Insert 105 preferably includes a plurality of circumferentially oriented teeth 111, 112 on its inside surface for gripping a hose end. Some of the teeth 111 may have a greater height than other teeth 112. Additionally or alternatively, teeth for gripping a hose may be disposed transversely within the insert. The insert may be made of any suitable material for gripping hose such as plastic, alloys with aluminum, and alloys with iron. The insert may be formed in any number of ways, such as by casting, machining it from barstock, injection molding, or optionally and for economical reasons, it may be formed or shaped from an elongate strip of material. The insert could also take a number of other forms. For example, a number of non-continuous or continuous, generally washer-shaped units could be stacked into socket 101. In particular, non-continuous stacked inserts could be in the general form of a split-ring, similar to a split lock washer or in the form of an incomplete annulus, similar to a snap-ring.

Returning to FIG. 1, socket portion 101 might define a lip (107), such as in an extent of socket portion 101 opposite torque communication portion 103. Lip 107 might be used to retain insert 105 and/or a weather seal, of unbroken circumference, might be disposed in a socket between the insert and the lip, as discussed in greater detail below, to act as a weather seal and/or to seal any possible leak path, such as might be perceived as being introduced through the use of a "C" shaped, or other non-continuous, insert or the like.

Figure 2:
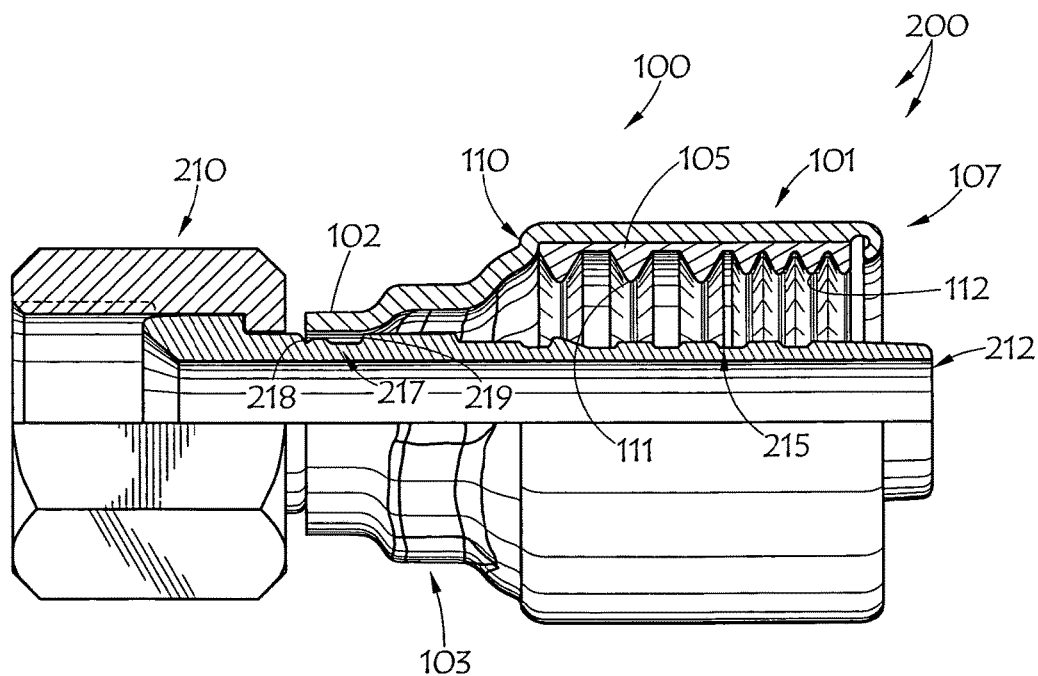
FIG. 2 is a fragmented, generally quarter-sectioned, side view of an embodiment of the present inventive ferrule deployed in conjunction with a stem and nut of an embodiment of the present inventive coupling, prior to securing of the ferrule on the stem.
Figure 3:
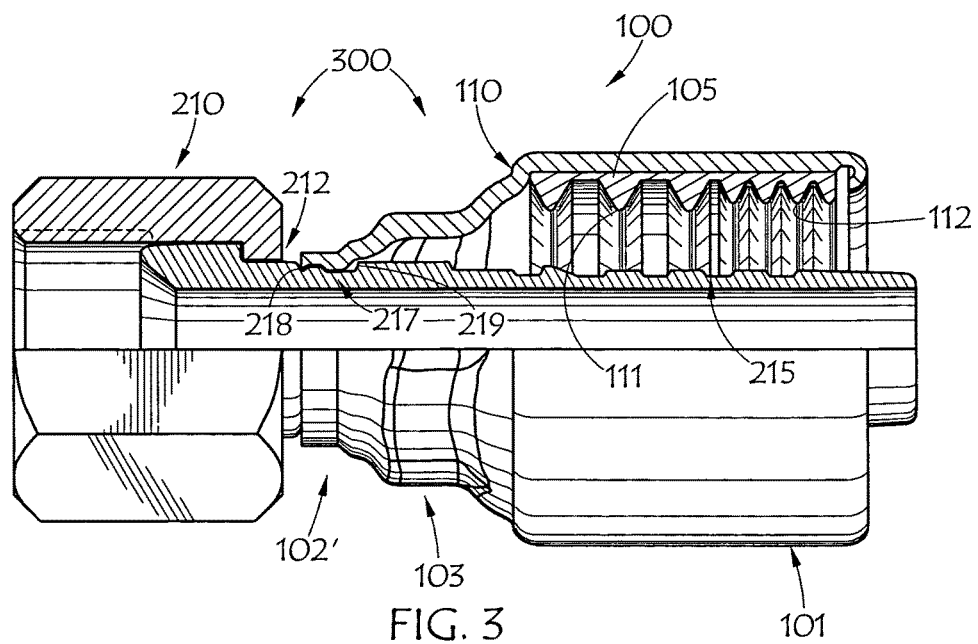
FIG. 3 is a fragmented, generally quarter-sectioned, side view of an embodiment of the present inventive coupling, with the ferrule secured to the stem.

Advantageously, in accordance with the present invention, the number of parts employed in a crimped-on fitting is reduced. Ferrule 100 replaces a collar having a back-up hex, or a stem with a unitary hex, either of which is may be employed in the prior art, with the present torque communication portion and attachment portion. Thus, a complete fitting such as shown in fragmented, generally quarter-sectioned, FIGS. 2 and 3 may, in accordance with various embodiments of the present invention, employ nut 210, stem 212, and an embodiment of present ferrule 100, which integrates socket 101, attachment portion 102, and torque communication portion 103 into a unitary one-piece unit, eliminating the need for a separate collar, or the like. In accordance with the present invention, embodiments of ferrule 100 may be staked or otherwise attached directly onto stem 212, such as by staking attachment portion 102 onto a corresponding portion of stem 212. Alternatively, stem 212 may be expanded to interface with ferrule 100 to attach the two parts. FIG. 2 shows an embodiment of ferrule 100 deployed in conjunction with stem 212 and nut 210, prior to securing of the ferrule on to the stem, while FIG. 3 shows coupling 200, with ferrule 100 secured to stem 212. Stem 212 also may have a knurled, generally deformed, or deformable portion under the stake, which interfaces with ferrule 100 in such a manner as to provide torque resistance between the ferrule and the stem.

Thus, an embodiment of hose end coupling 200 might, in accordance with the present invention, include the aforementioned unitary one-piece radially crushable ferrule 100 having crushable socket portion 101, securable attachment portion 102, and torque communication portion 103, which might be disposed between the socket and attachment portions. Such a coupling might also employ unitary one-piece stem 212 having exterior barb end portion 215 and exterior ferrule interface portion 217. When deployed, socket portion 101 may be disposed over and about barb end portion 215 and attachment portion 102 may be disposed over and about ferrule interface portion 217. Exterior ferrule interface portion 217 may be knurled. For example, ferrule interface portion 217 may be an exterior circumferential longitudinal stop groove, as shown in FIGS. 2 and 3 and attachment portion 102 may be disposed over and about longitudinal stop groove 217 for staking into the groove to interface with a knurl defined in conjunction with stop groove 217, securing ferrule 100 from rotational or axial movement relative to stem 212. In particular, in accordance with various embodiments, the knurl associated with interface groove 217 interfaces with ferrule attachment portion 102 to secure the staked ferrule from rotation relative to stem 212, and at least a portion of staked ferrule attachment portion 102 is deformed into interface groove 217 such that interface groove walls 218 and 219 prevent movement of ferrule 100 axially, along stem 212.

Hence, a method for providing a hose end coupling in accordance with the present invention might call for fashioning an embodiment of ferrule 100 of the present invention, such as shown in FIG. 1, by forming a torque communication portion in a unitary one-piece radially crushable ferrule, such as between a crushable socket portion and a deformable attachment portion formed in the unitary one-piece radially crushable ferrule. The area underneath or behind torque communication portion 103 may be hollow. In certain embodiments a reinforcement insert (not shown) may be disposed in such a hollow to reinforce torque communication portion 103. For example, a hexagonal shaped reinforcement insert, shaped generally like a nut, could be disposed behind a hex-shaped torque communication portion of a ferrule of the present invention. In deployment of ferrule 100, deformable attachment portion 102 is preferably disposed over hose stem 212, as shown in FIG. 2 and attachment portion 102 is staked, or otherwise secured, to stem 212 in a fashion that would result in coupling 300 shown in FIG. 3. Assembled coupling 300 is secured to a hose by inserting an open hose end into crushable socket portion 101, onto stem barb 215, and crushing socket portion 101, such as through crimping or swaging, to secure the coupling to the hose end, providing the hose end coupling shown in FIG. 4. To enhance gripping of the hose end by the coupling, insert 105, such as the aforementioned "C" shaped insert, one or more coiled inserts, or a number of flat stacked inserts may be deployed in socket portion 101 following forming of the ferrule, but prior to crushing of the socket portion. Inserts thus deployed grip the cover of the hose and frictionally interface with an interior of the socket following crushing of the socket.

Figure 4:
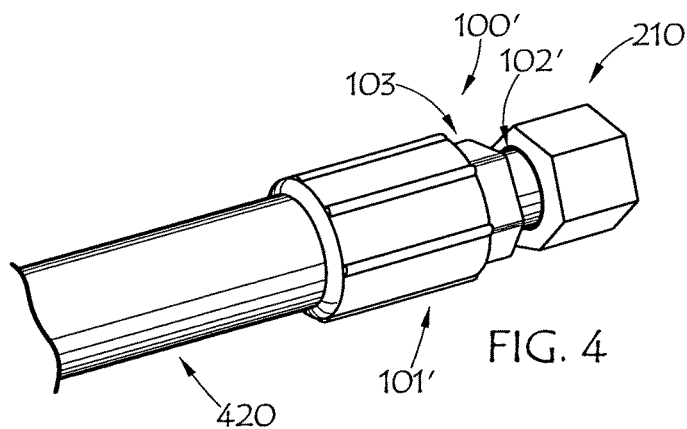
FIG. 4 is a perspective view of an embodiment of the present inventive coupling crimped onto a hose end.

FIG. 4 shows an embodiment of present inventive coupling 100' crimped onto an end of hose 420. Ferrule 101' is shown crimped onto the hose end and attachment portion 102' is shown staked onto a stem (not visible). Hence, hose 420 as shown in FIG. 4 is ready for attachment to a fluid power system by threading nut 210 onto an adapter or other termination. Preferably staking, or similar attachment, of attachment portion 102 and crimping or swaging of socket 101 affords torque communication portion 103 a degree of reinforcement, such that it may function to provide torque communication to an attached fluid power component, such as stem 212 and thereby stabilizing the coupling for attachment to an adapter or other termination.

Lip 107 may be formed by coiling a portion of socket 101 back upon itself, such as by orbit forming the outside diameter of the socket behind an insert after it is inserted. Alternatively, a lip may be formed by deforming an extent of socket 101 to provide a thickening, folding a crease, or similar structure resulting in a lip. In accordance with various embodiments of the present invention this coiled lip portion has a dual function; it retains the insert before crimping of the socket and also acts as a weather seal. This weather seal function can be further enhanced through the use of the aforementioned seal, of generally unbroken circumference, which might be disposed in the socket between the insert and the lip. To facilitate forming of lip 107, step 110 may be formed in ferrule 100, between torque communication portion 103 and socket 101. Step 110 may be employed to aid in positioning the ferrule during orbit forming of lip 107.

In various embodiments of ferrule 100 one portion of the wall of the ferrule may be thicker than another portion. For example, in FIG. 1 a portion of the ferrule wall defining torque communication portion 103 is thicker than a portion of the wall defining socket portion 101. The portion of the ferrule wall defining torque communication 103 portion may also be thicker than a portion of the wall defining attachment portion 102. To form such a ferrule a single cylindrical sleeve having a uniform wall thickness, such as a thickness corresponding to the thicker portion of the ferrule may be used. The shaping of the ferrule might include drawing the ferrule portion for the cylindrical sleeve such that the socket portion has a wall thinner than a wall of the torque communication portion, and in some embodiments, thinner than the attachment portion, while in other embodiments the ferrule may have a generally uniform wall thickness, such the ferrules shown in FIGS. 2 and 3.

Functionality and strength of the torque communication portion can be improved by mechanically working the material. This has can have several benefits, reduction of radii and creation of torque communication corners or pre-stressing the material and work hardening the material making up the torque communication portion. By introduction such a process to work/manipulate the material making up a torque communication portion, the torque transition capability of the ferrule can be increased by greater than fifty percent.

As noted, ferrule 100 may be pressed, punched, drawn or otherwise formed from a sheet of mild steel to shape socket portion 101, attachment portion 102, and torque communication portion 103. When forming ferrule 100, and particularly torque communication portion 103 out of a sheet of metal the inside corners may be created using a punch. The resulting inside corners may be sharp, but the corresponding outside corners have a shape that is generally a function of the thickness of the metal sheet used to form the ferrule, as the metal "flows" around the punch and within a die. As an empirical rule of thumb, the outside corner radii are equal to the inside plus 1-2 times the material wall section. These radii are improved during pressing operations by additional operations that manipulate the corners. However, generally this means that the resulting outside corners are more rounded. Such rounded corners would provide less ability to transmit torque than relatively sharper corners. Thus, it may be desirable to form sharper cornered torque communication portions. Such a sharper corner torque communication portion enables ferrules to transmit a greater amount of torque before the torque communication portion deforms.

Figure 10:
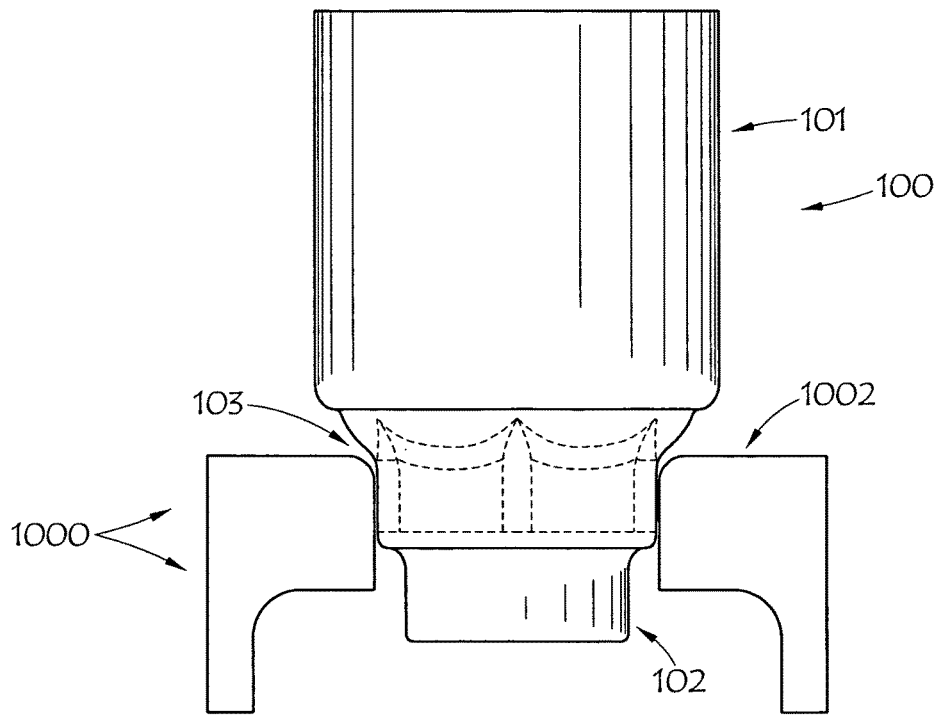
FIG. 10 is a partially fragmented, generally cross-sectional diagrammatic top or side view of an embodiment of a portion of a torque communication corner sharpening and/or work hardening station employed in accordance with the present invention.
Figure 11:
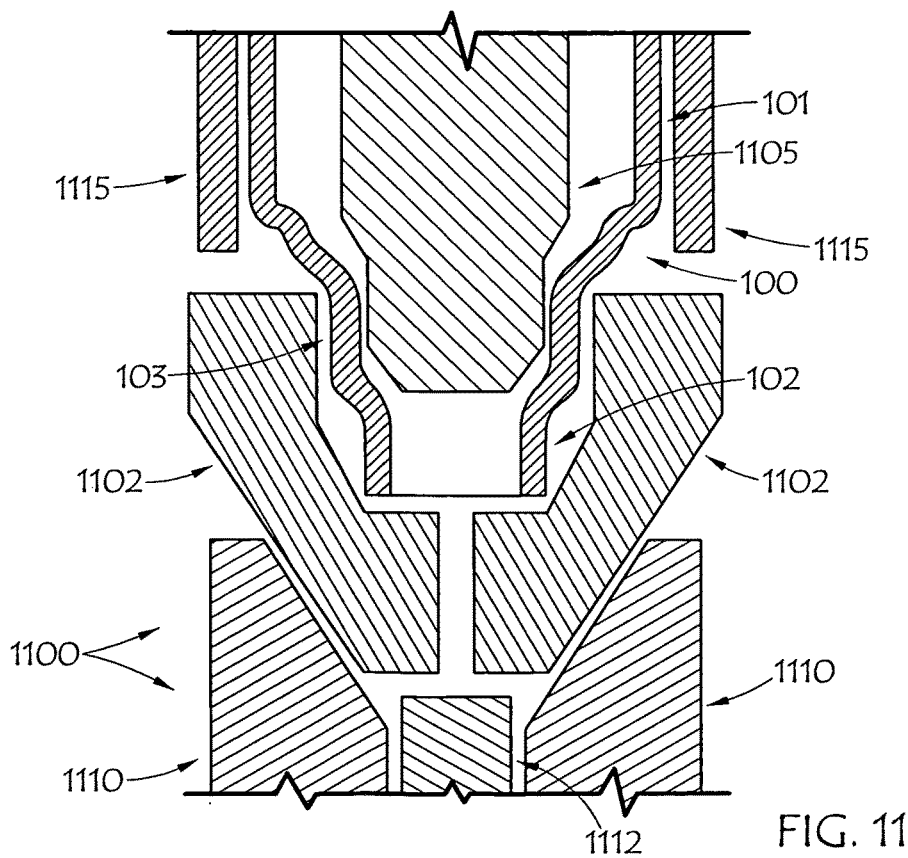
FIG. 11 is a partially fragmented, generally cross-sectional diagrammatic top or side view of embodiment of a portion of a torque communication corner sharpening and/or work hardening punch station employed in accordance with the present invention.
Figure 12:
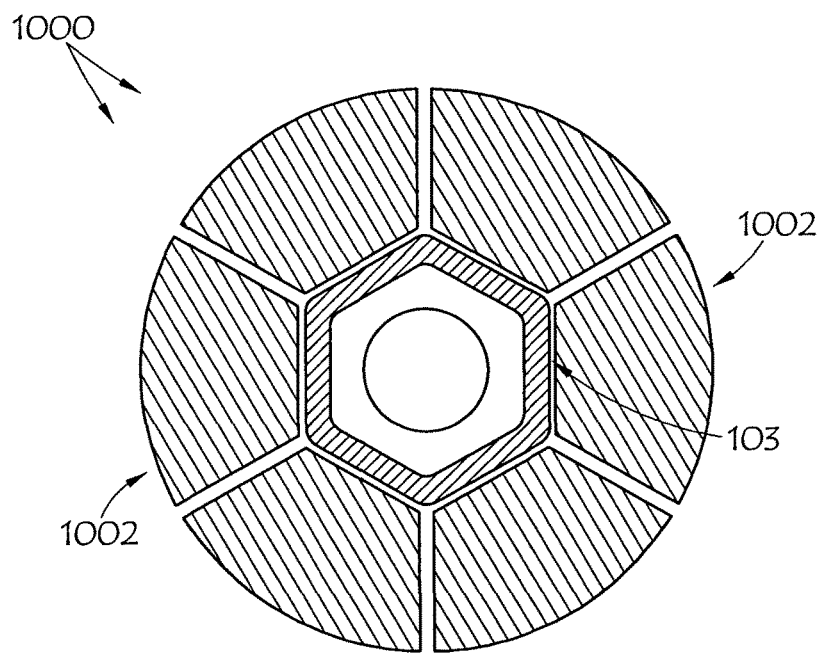
FIG. 12 is a diagrammatic, generally cross-sectional end or front view of the embodiment of a portion of a torque communication corner sharpening and/or work hardening (punch) station of FIG. 10 or 11, showing a collet or die set deployed in conjunction with a torque communication portion prior to working of the torque communication portion in accordance with the present invention.
Figure 13:
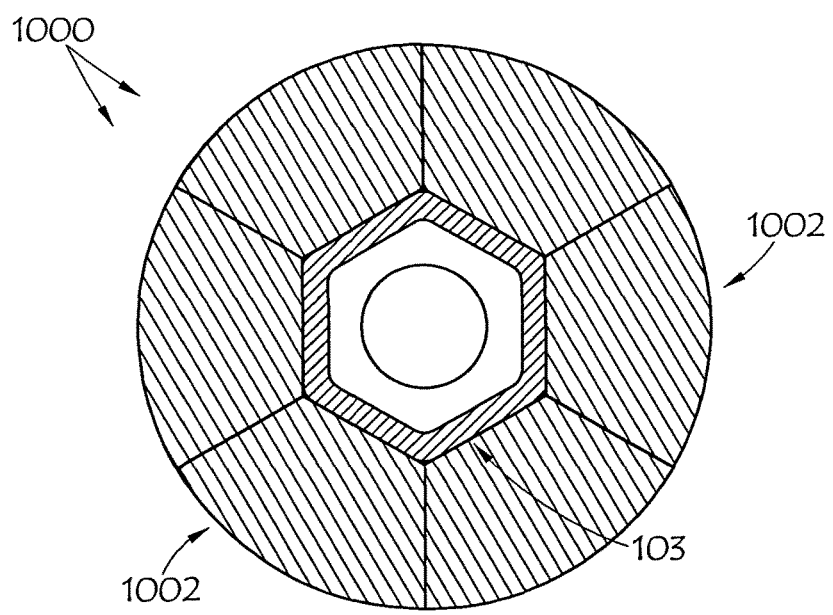
FIG. 13 is a diagrammatic, generally cross-sectional end or front view of the embodiment(s) of a portion of a torque communication corner sharpening and/or work hardening (punch) station of FIG. 10 or 11, showing a collet or die set deployed in conjunction with a torque communication portion during working of the torque communication portion in accordance with the present invention.

The present ferrules may be pressed using progressive die forming, drawing, and/or the like. Station 1000 and/or 1100, shown in FIG. 10 through 13 may be employed to strengthen and/or sharpen corners of the torque communication portion either during the pressing operation or as a secondary operation. FIGS. 10 and 11 are a partially fragmented, generally cross-sectional diagrammatic top or side views of respective stations 1000 and 1100, while FIGS. 12 and 13 are diagrammatic, generally cross-sectional end or front views showing torque communication portion 103 in conjunction with collet, die set or staking tool sets 1002 (or 1102).

In FIG. 10 ferrule 100 is placed inside die set 1002 at station 1000. The formed flats of the torque communication portion 103 are aligned with the die set 1002 and the dies are contracted to a specified geometry to press the torque communication portion, improving its integrity. This same methodology can be employed to transform the torque communication portion from a cylinder or mostly cylindrical shape into an angular shape for improved torque communication. Die set 1002 is then retracted and the ferrule 100 can be removed.

Further control of the geometry can be achieved by deploying a mandrel having a desired internal shape of the torque communication portion, inside the formed torque communication portion, and thus controlling the wall of the torque communication portion to be controlled internally and externally to produce improved geometry for torque communication and resilience under crushing.

In FIG. 11, punch station 1100 has a segmented collet 1102, which is held close to, generally in contact with, an initially formed torque communication portion, by die 1110 or the like. Mandrel 1105, preferably having a shape generally corresponding to the desired interior shape for the torque communication portion, may optionally be deployed inside the ferrule, into the initially formed torque communication portion, to prevent it from collapsing. Ejection mechanism 1112 and an associated guide system ensures movement of the collet is controlled during punching in station 1100.

From FIG. 12, die set 1002 is pressed into torque communication portion 103 (or the ferrule is pressed into collet 1102 pressing collet 1102 into die 1110, closing collet 11002 about the torque communication portion of the ferrule) transiting to FIG. 13, and thus work hardening the torque communication portion and/or forming the torque communication into a shape having generally sharper and stronger corners.

During initial forming of the ferrule, prior to forming at station 1000 or 1100, the ferrule may be annealed, which results in softening of the torque communication portion. By pressing against each flat of the torque communication portion during further forming at station 1000 or 1100, or in a secondary operation, the torque communication portion is work hardened and as a result it is provided greater integrity. As an additional advantage, this working of the torque communication portion also improves the torque communication portion flats such that back-up wrenches seat better and rounding off of corners of the torque communication portion by wrenches is reduced. Pressing the flats of torque communication portion 1003 may reduce it in size by a small amount. Therefore, the torque communication portion may be initially appropriately sized prior to work hardening, such that the torque communication portion resulting from the work hardening has the desired finished size, particularly following crimping or swaging of the ferrule onto a hose.

In accordance with various embodiments of the present invention a torque communication portion of the present ferrules may be work hardened by other means, such as heat treatment, tempering, quenching, etc. Advantageously, such methods may not result in resizing. Alternatively, localized annealing may be used to soften deformable sections of a ferrule, such as the socket and/or attachment portions, rather than hardening the torque communication portion.

FIG. 5 is a perspective view of "C" insert 505, an embodiment of an insert that may be employed in the present couplings, systems and methods. "C" shaped insert embodiment 505 defines inner-circumferential teeth 506 and corresponding outer-circumferential depression indentions 508. This design allows insert 505 to be formed by rolling barstock or sheet material having raised splines, that become inner-circumferential teeth 506, and corresponding indentions, that become outer-circumferential depressions 508. Following crimping or other crushing of a socket housing "C" insert 505, not only do teeth 505 "bite" into the hose cover, but outer-circumferential depressions 508 mechanically interface with the interior of the socket, allowing material comprising the interior of the socket to flow into the depressions, arresting longitudinal movement of the hose and/or the ferrule along the axis of stem 112. Additionally, illustrated "C" insert embodiment 505 has fingers 510, which interdigitate upon crimping of a socket housing the insert.

As discussed above, in accordance with some embodiments of the present invention one or more coiled inserts may be deployed in conjunction with a radially crushable ferrule. Embodiments of such a ferrule may or may not have the attachment and/or a torque communication portions shown in FIGS. 1 through 4. For example, FIG. 6 is a fragmented, generally quarter-sectioned, side view of an embodiment of ferrule 600, which employs a coiled insert in accordance with various embodiments of the present invention. Ferrule 600 might be primarily a crushable socket, wherein coiled insert 605 for gripping a hose end is retained. The cross section of the coiled insert can be round, trapezoidal as shown in FIG. 6, or profiled to best suit a particular application, such as may vary based on the material making up ferrule 600 and/or the cover of the hose to be gripped. As ferrule 600 is crimped, swaged, or otherwise deployed on a hose, over stem 612, the coiled insert reduces in diameter to grip the hose. Material of the coiled insert can be steel including stainless steel, aluminum, plastic or other suitable material. The coiled insert can be close coiled, open coiled, square ended, open ended, ground ended or not ground. As noted, more than one coiled insert may be used. As shown in FIG. 7 an embodiment of ferrule 700, employing two coiled inserts might use first large gauge coiled insert 705 to grip a hose tightly and second smaller gauge insert 710 to provide an even seal. In the illustrated embodiment of FIG. 7, the two inserts are coiled in opposite directions to help eliminate any potential for the hose to rotate within the coupling. However two or more inserts coiled in the same direction may be used.

The use of a coiled insert results in a number of advantages. The insert may be created from simpler and cheaper components. The methods and materials used to manufacture a coiled insert are industry standard. Additionally, a coiled insert may more easily be deployed into a ferrule socket having a lip, eliminating any need to orbit form the lip after insertion of the insert. For example the insert may be diametrically compressed, such as by elongating or constricting the insert to allow insertion of the insert into the socket. Alternatively, a coiled insert may be "screwed" into the socket. A series of coiled insert sections can be used, as can inserts made from different materials. Thus, an ability to choose the number and/or nature of insert coils, depending on application requirements, is provided.

Figure 8:
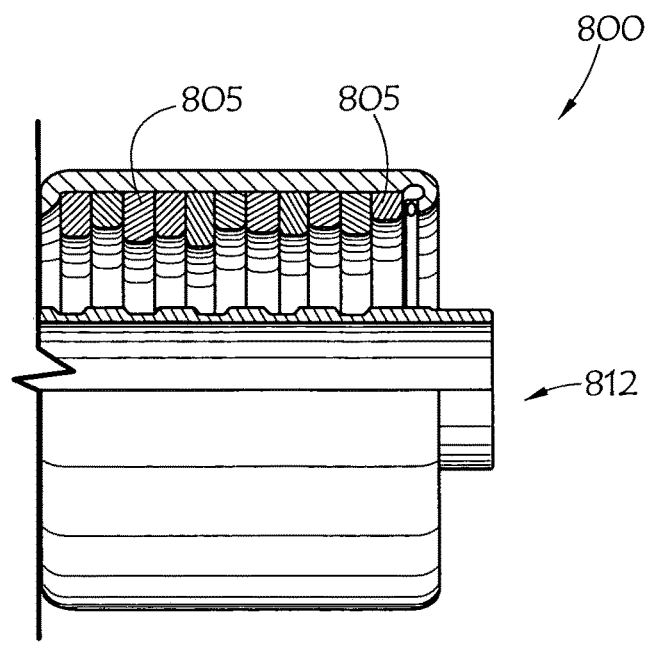
FIG. 8 is a fragmented, generally quarter-sectioned, side view of an embodiment of a ferrule employing a plurality of stacked inserts in accordance with various embodiments of the present invention.

FIG. 8 is a fragmented, generally quarter-sectioned, side view of an embodiment of ferrule 800, which employs a number of generally circular stacked inserts 805, in accordance with various embodiments of the present invention.

Ferrule 800 might also be primarily a crushable socket, wherein stacked inserts 805 for gripping a hose end are retained. These stacked inserts may take a form similar to a split ring lock washer, a form similar to an annular snap ring, or any other similar form. The cross section of each stacked insert can be round, trapezoidal, stepped, or otherwise profiled to best suit a particular application, such as may vary based on the material making up ferrule 800 and/or the cover of the hose to be gripped. As ferrule 800 is crimped, swaged, or otherwise deployed on a hose, over stem 812, the stacked inserts reduce in diameter to grip the hose and the outer edges of each of the stacked inserts preferably interfaces with an interior of the socket preventing movement of the stacked inserts and hence the hose relative to the socket. The stacked inserts may be made from steel, stainless steel, aluminum, plastic or other suitable material.

Figure 9:
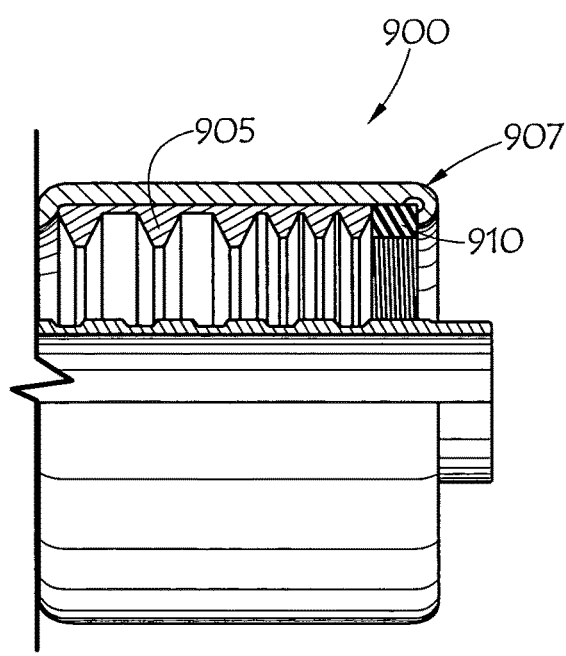
FIG. 9 is a fragmented, generally quarter-sectioned, side view of an embodiment of a ferrule employing a weather seal in accordance with various embodiments of the present invention.

As discussed above, in accordance with some embodiments of the present invention a weather seal may be deployed in conjunction with a radially crushable ferrule. Embodiments of such a ferrule may or may not have an attachment portion and/or a torque communication portion, such as shown in FIGS. 1 through 4. For example, FIG. 9 is a fragmented, generally quarter-sectioned, side view of ferrule embodiment 900 employing a weather seal in accordance with various embodiments of the present invention. Ferrule 900 might be primarily a crushable socket, wherein lip 907 is defined in an extent of the ferrule socket, such as at an end. Preferably, insert 905, for gripping a hose end portion, is retained in ferrule 900, with seal 910 disposed in the socket, between insert 905 and lip 907. Alternatively, a lip may be formed in each end of the ferrule and a seal may be disposed in each end of the socket, between each of the lips and the insert.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A unitary one-piece radially crushable ferrule comprising:
   a crushable socket portion;
   an attachment portion; and
   a work hardened, strengthened, polygonal, hollow, torque communication portion, generally contiguous with said socket portion and said attachment portion, and providing torque communication to an attached fluid power component,
   wherein said torque communication portion is defined between said socket portion and said attachment portion.

2. The ferrule of claim 1, wherein said socket portion is annealed.

3. The ferrule of claim 1, wherein said attachment portion is annealed.

4. The ferrule of claim 1 wherein said torque communication portion retains functional, hollow shape following crushing of said socket and deformation of said attachment portion to secure said ferrule to said component.

5. The ferrule of claim 4 adapted to secure said ferrule to said component only by deformation of said attachment portion.

6. The ferrule of claim 1 wherein said socket portion is adapted to retain an insert for gripping a hose end portion.

7. The ferrule of claim 1, wherein a portion of a wall of said ferrule defining said torque communication portion is thicker than a portion of said wall defining said socket portion.

8. The ferrule of claim 1, wherein a portion of a wall of said ferrule defining said torque communication portion is thicker than a portion of said wall defining said attachment portion.

9. The ferrule of claim 1, wherein a portion of a wall of said ferrule defining said torque communication portion and said attachment portion is thicker than a portion of said wall defining said socket portion.

10. The ferrule of claim 1 wherein an area underneath said torque communication portion is hollow and free of any solid insert material.

11. A unitary one-piece radially crushable ferrule comprising:
    a crushable socket portion;
    an attachment portion; and
    a work hardened, strengthened, polygonal, hollow, torque communication portion, generally contiguous with said socket portion and said attachment portion, and providing torque communication to an attached fluid power component, wherein said socket portion is annealed.

12. A unitary one-piece radially crushable ferrule comprising:
    a crushable socket portion;
    an attachment portion; and
    a work hardened, strengthened, polygonal, hollow, torque communication portion, generally contiguous with said socket portion and said attachment portion, and providing torque communication to an attached fluid power component, wherein said attachment portion is annealed.

* * * * *

UNITED STATES PATENT AND TRADEMARK OFFICE
CERTIFICATE OF CORRECTION

| | | |
|---|---|---|
| PATENT NO. | : 9,857,008 B2 | Page 1 of 3 |
| APPLICATION NO. | : 12/621283 | |
| DATED | : January 2, 2018 | |
| INVENTOR(S) | : Jonathan Clark Swift and Marvin Miller | |

It is certified that error appears in the above-identified patent and that said Letters Patent is hereby corrected as shown below:

On the Title Page

Below Abstract, delete "12 Claims, 6 Drawing Sheets" and insert --24 Claims, 6 Drawing Sheets--.

In the Claims

Column 12, Line 57, insert the following claims:

-- 13. A hose end coupling comprising the unitary one-piece radially crushable ferrule of claim 5, said hose end coupling further comprising:
 a unitary one-piece stem comprising:
  a barb end portion; and
  an exterior ferrule interface portion;
 wherein said unitary one-piece radially crushable ferrule of claim 5 is disposed over said stem.

14. A method of using the unitary one-piece radially crushable ferrule of claim 5 comprising:
 disposing said attachment portion of said unitary one-piece radially crushable ferrule of claim 5 over a hose stem;
 securing said attachment portion to said hose stem;
 inserting an open hose end into said crushable socket portion and onto said hose stem; and
 crushing said socket portion to secure said ferrule of claim 5 to said open hose end.

15. The method of claim 14, further comprising:
 deploying an insert in said socket portion, said insert gripping said open hose end and frictionally interfacing with an interior of said socket portion following said crushing.

Signed and Sealed this
Tenth Day of April, 2018

Andrei Iancu
*Director of the United States Patent and Trademark Office*

16. A method of making the unitary one-piece radially crushable ferrule of claim 5 comprising:
forming said polygonal, hollow torque communication portion in said unitary one-piece radially crushable ferrule, contiguous with said crushable socket portion and said attachment portion formed in said unitary one-piece radially crushable ferrule, and wherein said torque communication portion is defined between said crushable socket portion and said attachment portion; and
strengthening and work hardening said torque communication portion, said strengthening and work hardening comprising:
disposing a die set about the formed torque communication portion; and
pressing the formed torque communication portion with dies of said die set, thereby strengthening corners of said polygonal, hollow torque communication portion.

17. The method of claim 16, wherein said forming comprises forming said torque communication portion from a cylinder.

18. The method of claim 16, wherein said pressing presses the formed torque communication portion into a work hardened torque communication portion with smaller comer radii.

19. The method of claim 16, wherein said forming comprises forming said torque communication portion to have a size greater than it has following said strengthening, said strengthening resulting in said torque communication portion having a desired size.

20. The method of claim 16, wherein said forming comprises shaping said ferrule from a single cylindrical sleeve having a uniform wall thickness, said shaping further comprising drawing said socket portion from said cylindrical sleeve such that said socket portion has a wall thinner than a wall of said torque communication portion.

21. The method of claim 16, wherein said forming comprises shaping said ferrule from a single cylindrical sleeve having a uniform wall thickness and said shaping further comprises drawing said ferrule and socket portions from said cylindrical sleeve such that said ferrule and socket portions have walls thinner than a wall of said torque communication portion.

22. The method of claim 16 wherein said strengthening further comprises:
deploying a mandrel having a desired internal shape of the torque communication portion, inside the formed torque communication portion prior to said pressing.

23. A method of making a unitary one-piece radially crushable ferrule, said ferrule comprising:
a crushable socket portion;
an attachment portion; and
a work hardened, strengthened, polygonal, hollow, torque communication portion, generally contiguous with said socket portion and said attachment portion, and providing torque communication to an attached fluid power component,
wherein said torque communication portion is defined between said socket portion and said attachment portion;
said method comprising:
forming said polygonal, hollow torque communication portion in said unitary one-piece radially crushable ferrule, contiguous with said crushable socket portion and said attachment portion formed in said unitary one-piece radially crushable ferrule, and wherein said torque communication portion is defined between said crushable socket portion and said attachment portion; and strengthening and work hardening said torque communication portion, said strengthening and work hardening comprising:

disposing a die set about the formed torque communication portion; and pressing the formed torque communication portion with dies of said die set, thereby strengthening corners of said polygonal, hollow torque communication portion.

24. A hose end coupling comprising:

a unitary one-piece stem comprising:

a barb end portion; and an exterior ferrule interface portion; and a unitary one-piece radially crushable ferrule disposed over said stem, said ferrule comprising:

a crushable socket portion;

an attachment portion; and a work hardened, strengthened, polygonal, hollow, torque communication portion, generally contiguous with said socket portion and said attachment portion, and providing torque communication to an attached fluid power component, wherein said torque communication portion is defined between said socket portion and said attachment portion. --